United States Patent
Beierl et al.

(10) Patent No.: US 7,611,188 B2
(45) Date of Patent: Nov. 3, 2009

(54) CONVERTIBLE

(75) Inventors: Dominik Beierl, Korntal-Münchingen (DE); Lars Schulz, Schöneiche (DE); Felix Hermann, Leonberg (DE); Kristian Franz, Stuttgart (DE)

(73) Assignee: Dr. Ing. h.c. F. Porsche Aktiengesellschaft, Weissach (DE)

( * ) Notice: Subject to any disclaimer, the term of this patent is extended or adjusted under 35 U.S.C. 154(b) by 127 days.

(21) Appl. No.: 11/852,417

(22) Filed: Sep. 10, 2007

(65) Prior Publication Data
US 2008/0061592 A1 Mar. 13, 2008

(30) Foreign Application Priority Data
Sep. 8, 2006 (DE) .................. 10 2006 042 262

(51) Int. Cl.
*B60J 7/00* (2006.01)

(52) U.S. Cl. ......................... 296/121; 296/108

(58) Field of Classification Search .................. 296/121, 296/108, 107.17, 107.09, 107.11, 107.15, 296/107.16
See application file for complete search history.

(56) References Cited

U.S. PATENT DOCUMENTS

| 6,481,781 | B2 | 11/2002 | Bergerhoff et al. |
| 6,866,326 | B2 | 3/2005 | Hoppermann |
| 6,957,843 | B2 | 10/2005 | Guillez |
| 2004/0207232 | A1* | 10/2004 | Neubrand .............. 296/107.17 |

FOREIGN PATENT DOCUMENTS

| DE | 10057872 A1 | 5/2002 |
| DE | 10119069 A1 | 10/2002 |
| DE | 10258330 A1 | 7/2004 |

* cited by examiner

*Primary Examiner*—Joseph D Pape

(57) ABSTRACT

A convertible has a top which can be opened and can be put away and which has a rear window frame and, when the top is closed, at least one surface bow situated in front of said rear window frame in the direction of travel. A coupling linkage for carrying out a relative movement of the surface bow with respect to the rear window frame is arranged between the rear window frame and the surface bow. It is essential for the invention that at least two surface bows which are situated in front of the rear window frame in the direction of travel are provided, which surface bows, when the top is closed, form a continuous roof contour together with the rear window frame. Furthermore, the coupling linkage is designed in such a manner that, at the beginning of the opening of the top, the second surface bow can be moved downward relative to the adjacent first surface bow and relative to the rear window frame out of the roof contour.

4 Claims, 4 Drawing Sheets

CONVERTIBLE

CROSS-REFERENCE TO RELATED APPLICATION

This application claims the priority, under 35 U.S.C. §119, of German application DE 10 2006 042 262.7, filed Sep. 8, 2006; the prior application is herewith incorporated by reference in its entirety.

BACKGROUND OF THE INVENTION

1. Field of the Invention

The present invention relates to a convertible with a top that can be opened and which has a rear window frame and, when the top is closed, at least one surface bow disposed in front of the rear window frame in the direction of travel. A coupling linkage for carrying out a relative movement of the surface bow with respect to the rear window frame is mounted between the rear window frame and the surface bow and it is designed in such a manner that, at the beginning of the opening of the top, the surface bow can be moved downward relative to the rear window frame out of a roof contour, 2. Description of the Related Art A top of this type which can be opened for a convertible of the type in question is known, for example, from German published patent application DE 100 57 872 A1 and its counterpart U.S. Pat. No. 6,481,781 B2. There, the top is displaceable between a closed position, in which it covers the vehicle interior, and a storage position and having a front and a rear roof part. A coupling linkage for carrying out a relative movement of the front roof part is arranged between the front and the rear roof parts. The coupling linkage in this case is designed in such a manner that, at the beginning of the opening of the top, the front roof part can be moved downward relative to the rear roof part out of a roof contour. The coupling linkage comprises a four-bar linkage with two links and a sliding member which connects the two links and is held displaceably on a guide rail arranged on the rear roof part. The effect of this is that the coupling linkage can only execute a single, defined, positively controlled movement, as a result of which precise opening and closing of the top are ensured. This expressly concerns a hard top vehicle roof.

German published patent application DE 102 58 330 A1 and its counterpart U.S. Pat. No. 6,866,326 B2 disclose a retractable vehicle roof with two rigid roof elements which, in the closed state, are arranged one behind the other. The front roof element can be moved rearward via a drivable link mechanism, which acts on its sides and is designed as a double rocker, into a storage position in which it is retracted into the trunk. By contrast, the rear roof element is coupled to the front roof element via a respective connecting link connected to the link mechanism and is guided on said front roof element via a sliding guide in such a manner that, during the displacement of the front roof element, the rear roof element first of all passes into a position overlapping the latter and is then carried along together with it into the storage position.

Further collapsible tops in the form of hard tops are known, for example, from German published patent application DE 101 19 069 A1 and from U.S. Pat. No. 6,957,843 B2.

BRIEF SUMMARY OF THE INVENTION

It is accordingly an object of the invention to provide a convertible, which overcomes a variety of disadvantages associated with the heretofore-known devices and methods of this general type and which provides for an improved embodiment which makes it possible for the top to be put away in as space-saving a manner as possible and also for the same to be reliably and precisely opened and closed.

With the foregoing and other objects in view there is provided, in accordance with the invention, a convertible with a top that can be opened and stowed, the top comprising:

a rear window frame and at least two surface bows disposed in front of the rear window frame in a direction of travel of the convertible when the top is closed;

the at least two surface bows including a first surface bow and a second surface bow disposed between the first surface bow;

the rear window frame and the at least two surface bows, when the top is closed, forming a continuous roof contour together with the rear window frame;

a coupling linkage for effecting a relative movement of the surface bows with respect to the rear window frame, the coupling linkage being configured to effect, at a beginning of opening the top, movement of the second surface bow downward relative to the first surface bow and relative to the rear window frame out of the roof contour.

In other words, the invention is based on the general concept, in the case of a top formed with a plurality of roof sections, namely a rear window frame and a first and second surface bow arranged in front of the rear window frame when the top is closed, of providing a coupling linkage which, during the opening of the top, first of all moves the second surface bow downward relative to the first surface bow situated in front of it and relative to the rear window frame situated behind it out of a roof contour and, as a result, permits storage of the second surface bow below the rear window frame when the top is open, while, when the top is open, the first surface bow is put away above the rear window frame. The moving out of the second surface bow essentially orthogonally with respect to the roof contour or a roof plane at the beginning of the opening operation permits a subsequent, easy opening movement of the first surface bow which can firstly penetrate the construction space which was previously occupied by the second surface bow and is now free. Only by means of the moving of the second surface bow out of the roof contour at the beginning of the opening operation can the top comprising the rear window frame and at least two surface bows be put away in a manner which minimizes the construction space.

In contrast to conventional tops, the second surface bow can therefore be put away below the rear window frame while the first surface bow or, if appropriate, further roof sections can be put away above the rear window frame, as a result of which the roof sections can be stacked in a particularly space-saving manner.

For the passive relative movement of the second surface bow with respect to the rear window frame and the first surface bow, a rear link of a four-bar linkage is expediently guided displaceably in a positive guide mechanism, which is arranged on the rear window frame, by means of the joint arranged on the second surface bow. This embodiment obviates the need to fit a separate displacement device which brings about the relative movement of the second surface bow with respect to the first surface bow and the rear window frame. The omission of a displacement device of this type makes it possible for the top to be designed in a particularly simple manner structurally and, in addition, to be realized cost-effectively. In particular, a separate power supply for a displacement device of this type can also be omitted, thus avoiding an outlay on installation for additional supply lines. In addition, the positive guidance of the rear link of the four-bar linkage by means of its joint arranged on the second surface bow ensures a reliable and precise opening and closing movement of the top, as a result of which a top of particularly high quality can be produced.

Other features which are considered as characteristic for the invention are set forth in the appended claims.

Although the invention is illustrated and described herein as embodied in a convertible, it is nevertheless not intended to be limited to the details shown, since various modifications and structural changes may be made therein without departing from the spirit of the invention and within the scope and range of equivalents of the claims. It will be readily understood that the features mentioned above and those which have yet to be explained below can be used not only in the respectively stated combination but also in different combinations or on their own without departing from the scope of the present invention.

The construction and method of operation of the invention, however, together with additional objects and advantages thereof will be best understood from the following description of specific embodiments when read in connection with the accompanying drawings.

DESCRIPTION OF A PREFERRED EMBODIMENT OF THE INVENTION

Figure 1:
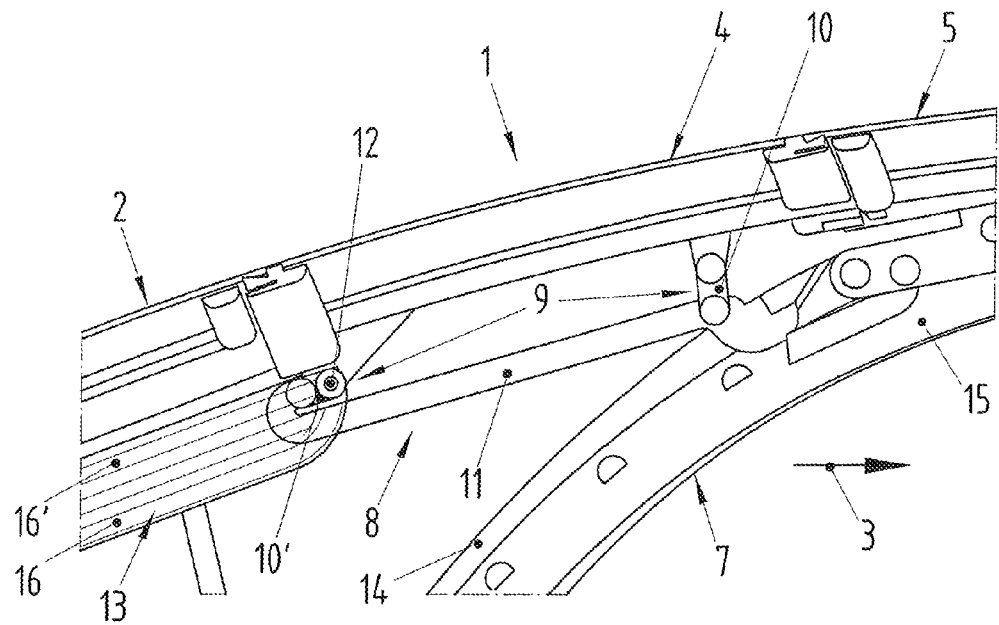
FIG. 1 is a partial, schematic side view of a top according to the invention in the closed state.

Referring now to the figures of the drawing in detail and first, particularly, to FIG. 1 thereof, there is shown a top 1 of a convertible (otherwise not illustrated) which can be displaced in a known manner between an open position and a closed position. FIG. 1 shows the closed position of the top 1, in which the latter covers a passenger compartment of the convertible and protects it from external weather effects.

Figure 5:
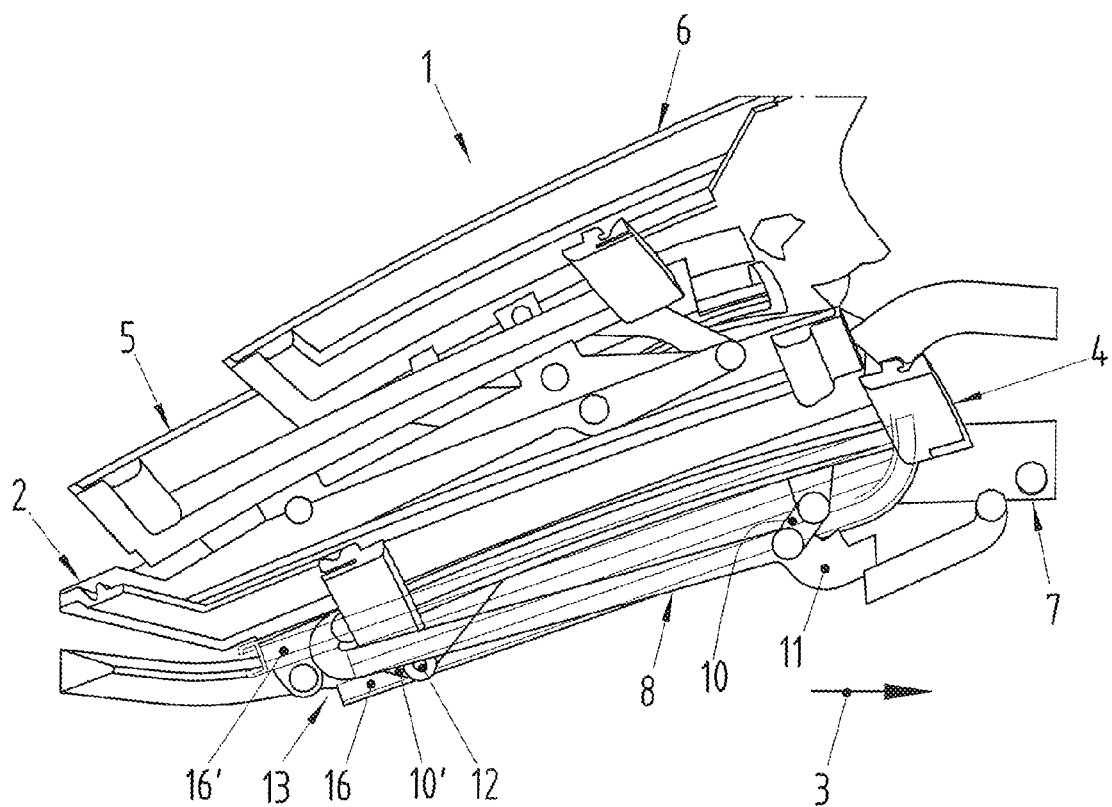
FIG. 5 is a side view of the stowed top in a fully open state.
Figure 8:
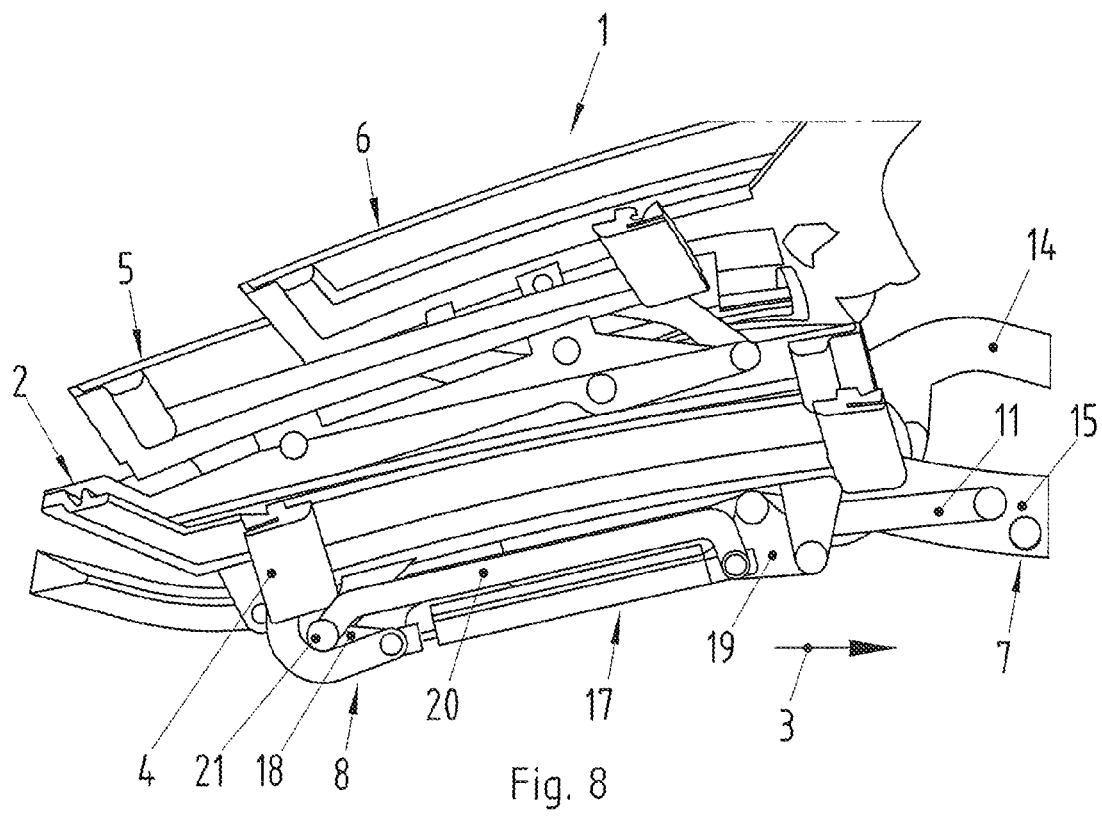
FIG. 8 is an illustration as in FIG. 5, but with the active displacement device.

The top 1 according to the invention has a rear window frame 2 with a rear window (not denoted) disposed on it, and, when the top 1 is closed, at least one surface bow 4 which is situated in front of the rear window frame in the direction of travel 3 and is referred to below as the second surface bow 4. A first surface bow 5 is arranged in front of the second surface bow 4 in the direction of travel 3 and an integral roof frame 6 is arranged in front of the first surface bow 5 (cf. FIGS. 5 and 8). The top 1 according to the invention therefore comprises a total of four roof sections 2, 4, 5 and 6 which, when the top 1 is closed, form a continuous roof contour and which, when the top 1 is open, can be stowed or put away stacked one above another in a rear region of the convertible. When the top 1 is stowed, i.e. is open, the second surface bow 4, as apparent from FIGS. 5 and 8, is put away below the rear window frame 2, while the first surface bow 5 and the integral roof frame 6 are put away above the rear window frame 2. In order to displace the top 1 between its closed position and its open position, a driving linkage 7 is provided which is coupled either directly or indirectly to the individual roof sections 2, 4, 5 and 6.

In order to be able to put away the top 1 in the above-described manner, at the beginning of the opening movement of the top 1, the second surface bow 4 has to be movable downward relative to the rear window frame 2 and relative to the adjacent first surface bow 5 out of the roof contour. This movement out during the opening of the top 1 or movement in during the closing of the top 1 is brought about by a coupling linkage 8 which is arranged between the rear window frame 2 and the second surface bow 4. In this case, the coupling linkage 8 comprises a four-bar linkage 9 with two links 10, 10' mounted in each case on the second surface bow 4, and a coupling member 11 connecting the two links 10, 10'. The link 10', i.e. the rear link of the four-bar linkage 9, as seen in the direction of travel 3, is mounted at one end in an articulated manner on the second surface bow 4 and at the other end on the coupling member 11, which likewise also applies to the front link 10 of the four-bar linkage 9. In the direction of travel 3 in front of the articulated connection of the coupling member 11 to the link 10, the coupling member 11 is additionally mounted in an articulated manner on the driving linkage 7. In order to be able to bring about the above-described displacement movement of the second surface bow 4 out of the roof plane during the opening of the top 1, the rear link 10' of the four-bar linkage 9 is additionally guided displaceably in a positive guide mechanism 13, which is arranged on the rear window frame 2, by means of the joint 12 arranged on the second surface bow 4. The positive guide mechanism 13 can be designed in the manner of a rail or a slotted guide mechanism.

FIG. 1 shows the top 1 according to the invention in the closed state in which all of the roof sections 2, 4, 5 and 6 are arranged with respect to one another in such a manner that they form the abovementioned continuous roof contour. Accordingly, FIG. 1 shows the starting state for an opening movement of the top 1, which is described in more detail with reference to FIGS. 2, 4 and 5.

Figure 2:
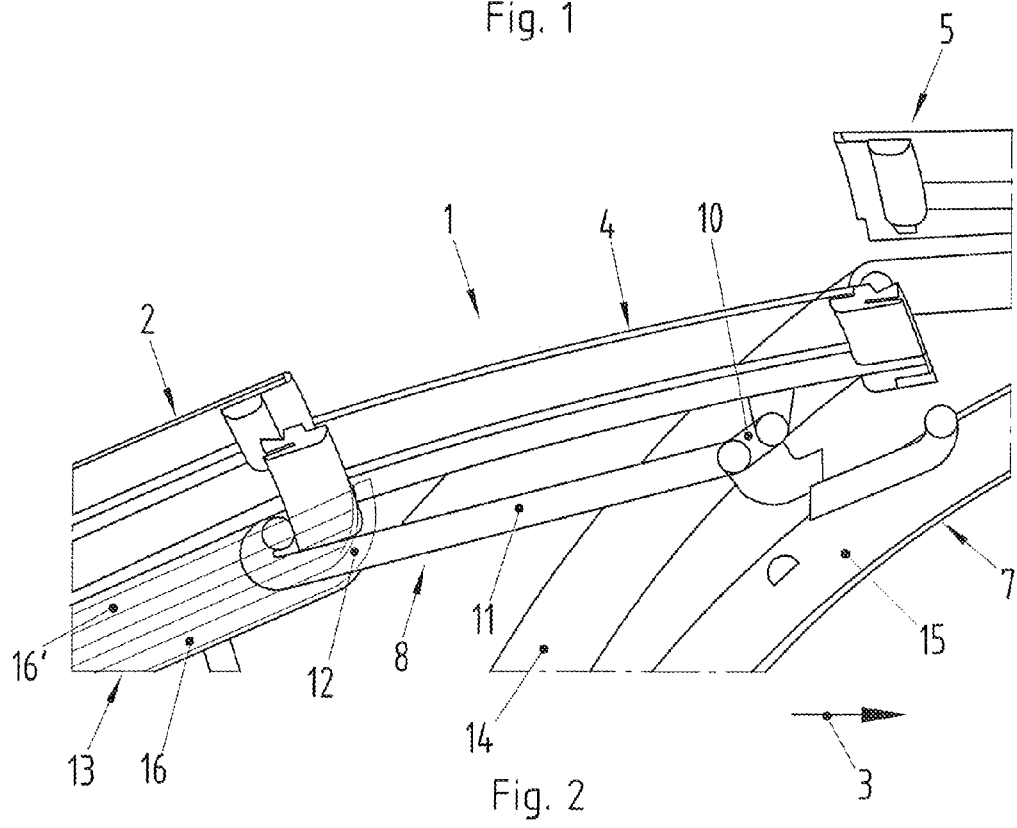
FIG. 2 is a similar view of the top shown in FIG. 1 in a slightly open state.

FIG. 2 shows a state shortly after the beginning of the opening movement of the top 1, the movement of the second surface bow 4 downward out of the roof contour being initiated by the driving linkage 7 and being brought about by the positive guide mechanism 13 in association with the four-bar linkage 9. In FIG. 2, a rear arm 14 of the driving linkage 7 has already moved away slightly from a front arm 15 of the driving linkage 7 and thereby causes the four-bar linkage 9 to fold over, as a result of which, firstly, the front link 10 of the four-bar linkage 9 is rotated and at the same time the joint 12, which is arranged on the second surface bow 4, is displaced downward along the positive guide mechanism 13. The four-bar linkage 9 together with the positive guide mechanism 13 therefore brings about a passive positive displacement of the second surface bow 4 out of the roof plane or the roof contour at the beginning of the opening movement. In the same manner as the front link 10, the rear link 10' is also rotated at the beginning of the opening movement, to be precise about the joint 12, the coupling member 11 transmitting the displacement movement of the front arm 15 of the driving linkage 7 to the four-bar linkage 9, i.e. to the front link 10 and the rear link 10' of the four-bar linkage 9. At its rear end, the coupling member 11 has a J-shaped curve.

Figure 3:
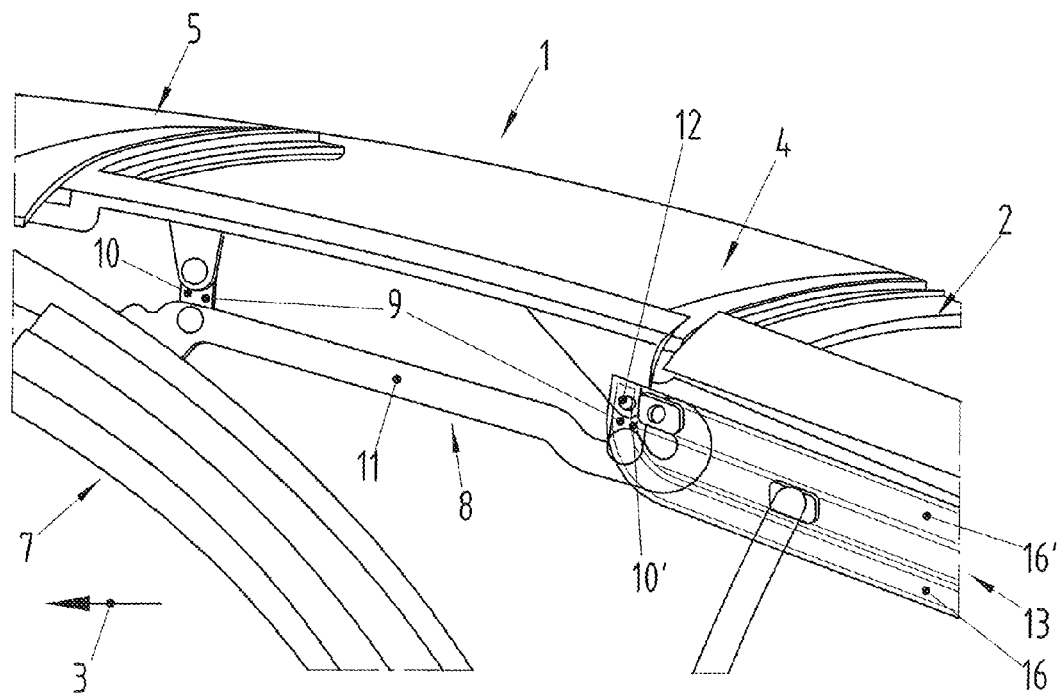
FIG. 3 is a perspective view of the top, in the closed position of FIG. 1.
Figure 4:
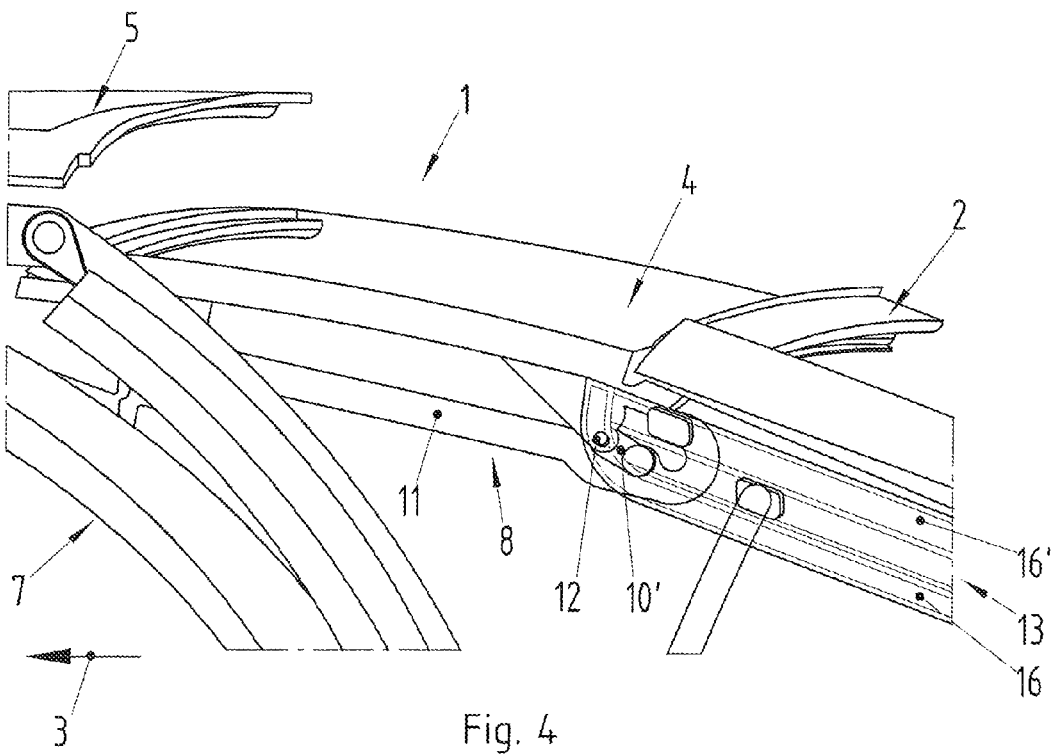
FIG. 4 is a perspective view of the top, in the slightly open position of FIG. 2.

FIGS. 3 and 4 show the top 1 in comparable states to the ones illustrated in FIGS. 1 and 2, but from a different perspective, essentially from the convertible interior. It also becomes clear here that, at the beginning of the opening movement, the second surface bow 4 first of all moves downward out of the formerly closed and continuous roof contour while at the same time the first surface bow 5 is displaced upward with respect to the roof contour and with respect to the second surface bow 4. This essentially opposed displacement movement is brought about by the driving linkage 7 and the coupling linkage 8 which is connected thereto in terms of action. In principle, the positive guide mechanism 13 has two different guide tracks 16, 16', the joint 12 being guided in the guide track 16 during the opening or closing movement of the top 1, and the coupling member 11 being guided by means of its end curved in a J-shaped manner in the guide track 16'. By means of the four-bar linkage 9 in association with the positive guide mechanism 13, a passive relative movement of the second surface bow 4 with respect to the rear window frame 2 and the first surface bow 5 can therefore be enforced.

FIG. 5 shows the top 1 according to the invention in a fully open, i.e. put-away state, in which the integral roof frame 6 is arranged above the first surface bow 5 and above the rear window frame 2 and above the second surface bow 4. According to the invention, the second surface bow 4 is arranged below the rear window frame 2, permitting a particularly large package effect and therefore a space-saving stacking of the top 1 in the put-away state.

Figure 6:
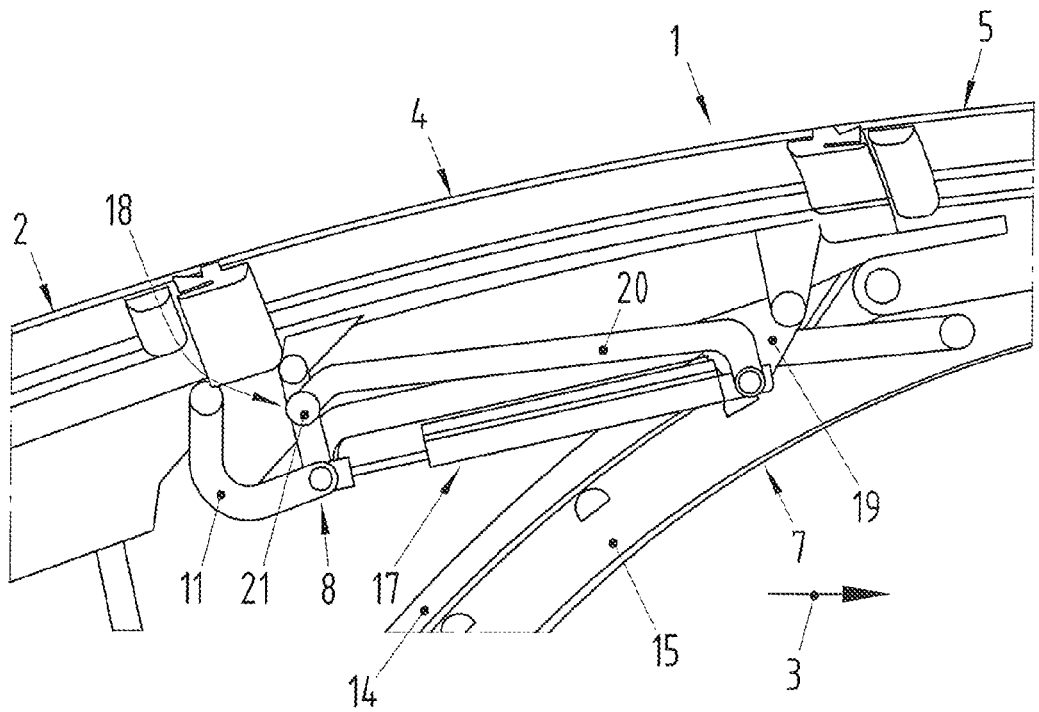
FIG. 6 is a side view of the novel top in the closed state with an active displacement device arranged on a coupling linkage.
Figure 7:
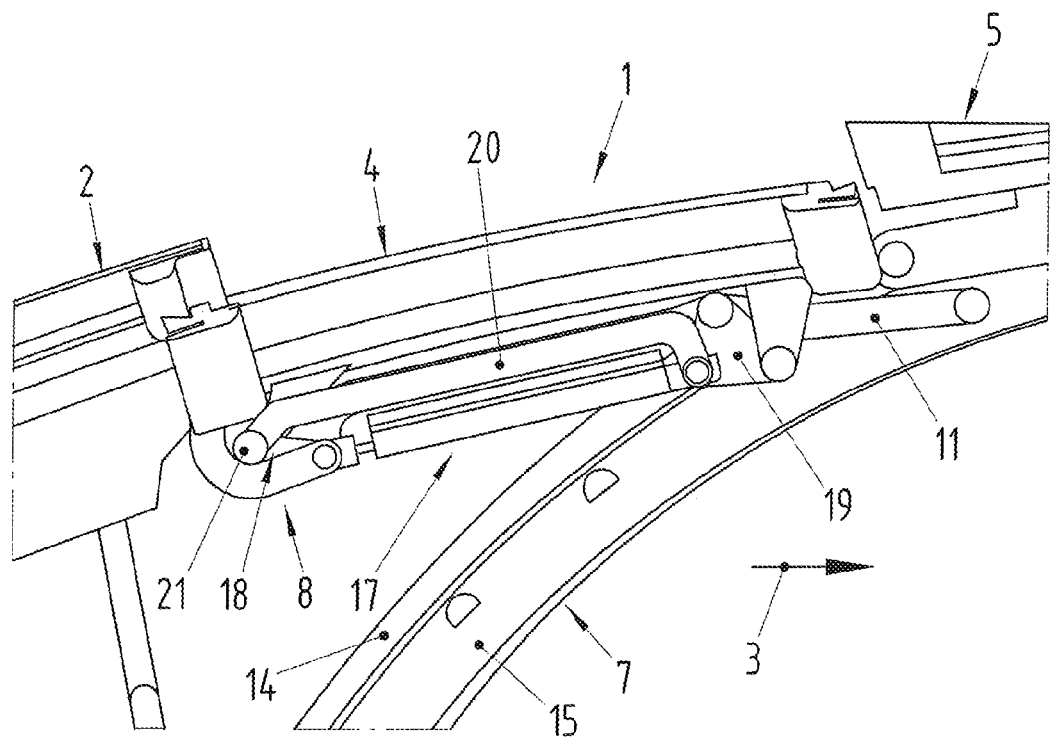
FIG. 7 is a view similar to FIG. 2, but with the active displacement device according to the invention.

In an embodiment illustrated according to FIGS. 6 to 8, the coupling linkage 8 has, for the active relative movement of the second surface bow 4 with respect to the rear window frame 2 and the first surface bow 5, a displacement device 17 which is designed here by way of example as a piston-cylinder unit. Other displacement devices 17 which bring about a linear adjustment are expressly also conceivable. The displacement device 17 is mounted at a rear end in an articulated manner on the coupling member 11 and at the same time in an articulated manner on a triple-jointed bar 18 while it is mounted at its front end on an articulated plate 19 and at the same time in an articulated manner on a connecting member 20. The triple-jointed bar 18, at one end, is mounted rotatably at a rear end of the second surface bow 4 and, at the other end, is mounted rotatably on the coupling member 11. Between its respective mountings on the end side, the triple-jointed bar 18 has a toggle joint 21 in which the connecting member 20 is connected at the same time to the triple-jointed bar 18 in an articulated manner. At the other end, the connecting member 20 is mounted, as mentioned above, in an articulated manner on the articulated plate 19 which, for its part, is arranged in an articulated manner at a front end of the second surface bow 4. The articulated plate 19 is connected at a third point of articulation of the same to the coupling member 11 in an articulated manner. The connecting member 20 and the displacement device 17 are therefore connected in an articulated manner to the articulated plate 19 at a common point of articulation while the displacement device 17 and the triple-jointed bar 18 are connected in an articulated manner to the coupling member 11 at a common point.

FIG. 6 shows, in turn, the top 1 in the closed state, in which the respective roof sections 2, 4, 5 and 6 form a continuous roof contour. At the beginning of the opening movement, the displacement device 17 is actuated, whereupon it becomes shorter and at the same time brings about, firstly, an inward bending of the triple-jointed bar 18 in the toggle joint 21 and, secondly, rotation of the articulated plate 19. The triple-jointed bar 18 is therefore transferred from its extended or dead center position, which it takes up in FIG. 6 when the top 1 is closed, into a bent position. The shortening of the displacement device 17 brings about, according to FIG. 7, the bending away of the triple-jointed bar 18 in the toggle joint 21 and the rotation of the articulated plate 19 and therefore a movement downward of the second surface bow 4 out of the initially continuous roof contour. In contrast to the passive displacement option according to the embodiments illustrated in FIGS. 1 to 5, in this case initially only a relative movement of the second surface bow 4 with respect to the rear window frame 2 and with respect to the first surface bow 5 takes place and, as a result, there is initially no relative movement of the first surface bow 5 out of the previously closed roof contour. This can also be seen by the fact that, according to FIG. 7, the front arm 15 and the rear arm 14 of the driving linkage 7 do not undergo any relative movement with respect to each other at the beginning of the opening movement.

FIG. 8 shows the top 1 with the displacement device 17 according to the invention in its fully open state, i.e. in a put-away state in which the displacement device 17 retains its shortened position and in which the individual roof sections 2, 4, 5 and 6 are stacked one above another in the same manner as described in FIG. 5.

A closing movement of the top 1 according to the invention takes place independently of the selected embodiment, i.e. independently of whether an active displacement device 17 is provided or, conversely, is not provided, with, at the end of the closing movement, the second surface bow 4 being moved from below into its end position in which it forms a continuous roof contour together with the adjacent roof sections 2 and 5.

It will be understood that seals and sealing elements are provided between the individual roof sections 2, 4, 5 and 6 and protect the convertible interior from external weather effects when the top 1 is closed. In general, a non-illustrated flexible covering can also be provided and covers at least parts of the top 1 and, as a result, brings about protection against external weather effects. However, a covering of this type is not fastened to the second surface bow 4 or connected thereto, and therefore, during the opening and closing of the top 1, the second surface bow 4 can be displaced under the rear window frame 2 and, in turn, can be retrieved from this position.

The invention claimed is:

1. A convertible with a top that can be opened and stowed, the top comprising:
    a rear window frame and at least two surface bows disposed in front of said rear window frame in a direction of travel of the convertible when the top is closed;
    said at least two surface bows including a first surface bow and a second surface bow disposed between said first surface bow and said rear window frame;
    said rear window frame and said at least two surface bows when the top is closed, forming a continuous roof contour;
    a coupling linkage for effecting a relative movement of said surface bows with respect to said rear window frame, said coupling linkage being configured to effect, at a beginning of opening the top, movement of said second surface bow downward relative to said first surface bow and relative to said rear window frame out of the roof contour; and
    when the top is put away, said second surface bow is stowed below said rear window frame and said first surface bow is stowed above said rear window frame.

2. The convertible according to claim 1, wherein the top further includes an integral roof frame in front of said first surface bow, in the direction of travel, when the top is closed, and said integral roof frame is stowed above said rear window frame when the top is put away.

3. A convertible with a top that can be opened and stowed, the top comprising:

a rear window frame and at least two surface bows disposed in front of said rear window frame in a direction of travel of the convertible when the top is closed;

said at least two surface bows including a first surface bow and a second surface bow disposed between said first surface bow and said rear window frame;

said rear window frame and said at least two surface bows when the top is closed, forming a continuous roof contour;

a coupling linkage for effecting a relative movement of said surface bows with respect to said rear window frame, said coupling linkage being configured to effect, at a beginning of opening the top, movement of said second surface bow downward relative to said first surface bow and relative to said rear window frame out of the roof contour;

said coupling linkage being a four-bar linkage with two links mounted in each case on said second surface bow, and a coupling member connecting said two links; and for a passive relative movement of the second surface bow with respect to said rear window frame and said first surface bow, a rear link of said four-bar linkage being guided displaceably in a positive guide mechanism, mounted on said rear window frame, by way of a joint on said second surface bow.

4. The convertible according to claim 3, wherein a front end of said coupling member is connected at in an articulated manner to a driving linkage for opening and closing the top.

* * * * *